(12) United States Patent
Franceschini (10) Patent No.: US 8,844,131 B2
(45) Date of Patent: Sep. 30, 2014

(54) LEAF SEAL

(75) Inventor: Gervas Franceschini, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/564,278

(22) Filed: Aug. 1, 2012

(65) Prior Publication Data

US 2013/0038025 A1    Feb. 14, 2013

(30) Foreign Application Priority Data

Aug. 8, 2011 (GB) .................................. 1113590.2

(51) Int. Cl.
*B21K 25/00* (2006.01)
*F16J 15/32* (2006.01)
*F01D 11/00* (2006.01)

(52) U.S. Cl.
CPC ......... *F16J 15/3292* (2013.01); *F05D 2240/57* (2013.01); *F01D 11/003* (2013.01)
USPC .......................... 29/889.2; 277/355; 415/173.7

(58) Field of Classification Search
USPC ............ 29/889.2; 277/355; 415/173.7, 174.2, 415/230
See application file for complete search history.

(56) References Cited

U.S. PATENT DOCUMENTS

| | | | |
|---|---|---|---|
| 7,828,297 B2 * | 11/2010 | Hoebel et al. ................. | 277/412 |
| 2003/0071423 A1 | 4/2003 | Urlichs | |
| 2005/0125983 A1 * | 6/2005 | Uehara et al. .................... | 29/458 |
| 2007/0085277 A1 * | 4/2007 | Rhodes et al. ................. | 277/355 |
| 2007/0120326 A1 * | 5/2007 | Rhodes et al. ................. | 277/355 |
| 2007/0261225 A1 * | 11/2007 | Hogg et al. ..................... | 29/458 |
| 2008/0107525 A1 * | 5/2008 | Adis et al. ...................... | 415/230 |
| 2008/0122183 A1 * | 5/2008 | Braun et al. .................... | 277/355 |
| 2009/0243221 A1 * | 10/2009 | Olmes et al. ................... | 277/411 |
| 2009/0250879 A1 * | 10/2009 | Ruggiero et al. .............. | 277/355 |
| 2010/0143102 A1 * | 6/2010 | Deo et al. ..................... | 415/173.1 |
| 2010/0320697 A1 * | 12/2010 | Kono .............................. | 277/355 |

FOREIGN PATENT DOCUMENTS

| | | |
|---|---|---|
| EP | 1 878 955 A1 | 1/2008 |
| EP | 2 123 951 A1 | 11/2009 |
| EP | 2 206 938 A2 | 7/2010 |
| EP | 2206938 A2 * | 7/2010 |
| EP | 2 221 514 A2 | 8/2010 |

OTHER PUBLICATIONS

Great Britain Search Report issued in British Application No. 1113590.2 dated Dec. 6, 2011.
Jan. 11, 2013 European Search Report issued in European Patent Application No. EP 12 17 8790.

* cited by examiner

*Primary Examiner* — David Bryant
*Assistant Examiner* — Ruth G Hidalgo-Hernande
(74) *Attorney, Agent, or Firm* — Oliff PLC (57) ABSTRACT

A process is provided for forming a leaf-spacer pair for use in a leaf seal which effects a seal between two components. The process includes the steps of:
(a) providing a leaf section which maintains, in the leaf seal, wiping contact with one of the components, and a root section from which the leaf section extends and which, in the leaf seal, is fixed relative to the other component, the leaf section and the root section being formed from a first sheet of material of substantially uniform thickness;
(b) providing a spacer formed from a second sheet of material, the spacer being physically separate from the leaf section and the root section; and
(c) fastening the spacer to the root section to form a leaf-spacer pair in which the spacer overlays the root section and remains fixed relative thereto on handling of the leaf-spacer pair.

17 Claims, 7 Drawing Sheets

LEAF SEAL

The present invention relates to a process for forming a leaf-spacer pair for use in a leaf seal.

Figure 1:
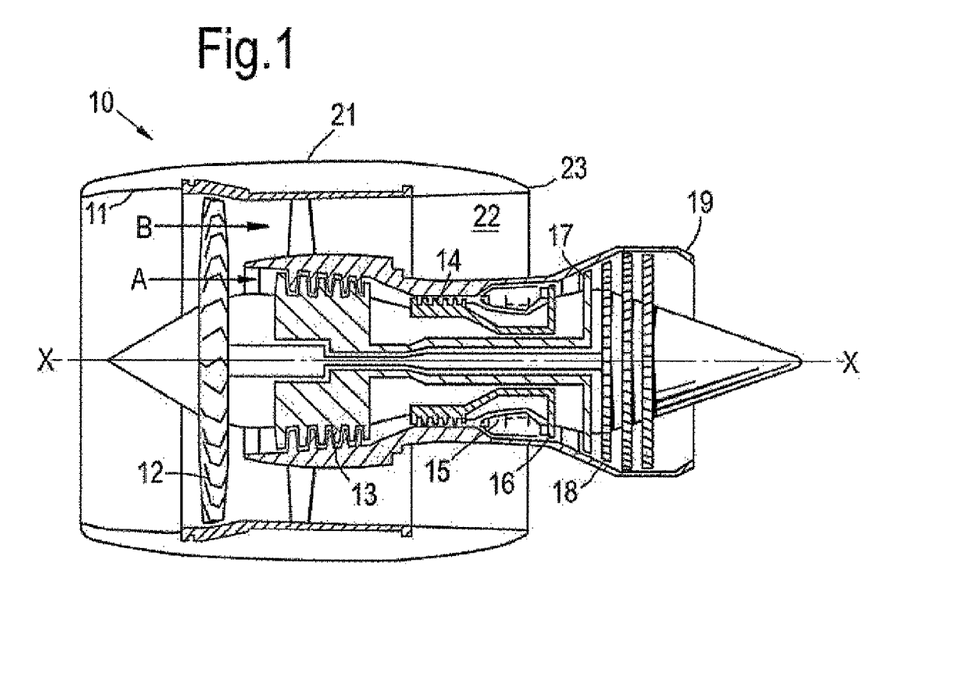
FIG. 1 shows schematically a longitudinal section through a turbofan engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leaf seals are formed from sections of leaf material appropriately presented in order to create a seal surface from juxtaposed leaf edges of respective leaves in an assembly. Typically the leaves are arranged circumferentially about a rotating shaft in order to present the leaf edges and therefore the seal surface towards that shaft in order to provide a seal barrier. Typically, spacer members are provided between each leaf in order to correctly arrange the seal elements for presentation of the leaf edges and therefore the seal surface. These spacers may be independent components or integrally formed with each leaf. The leaf edges and so the seal surface effectively floats upwards and downwards relative to a rotating surface.

Figure 2:
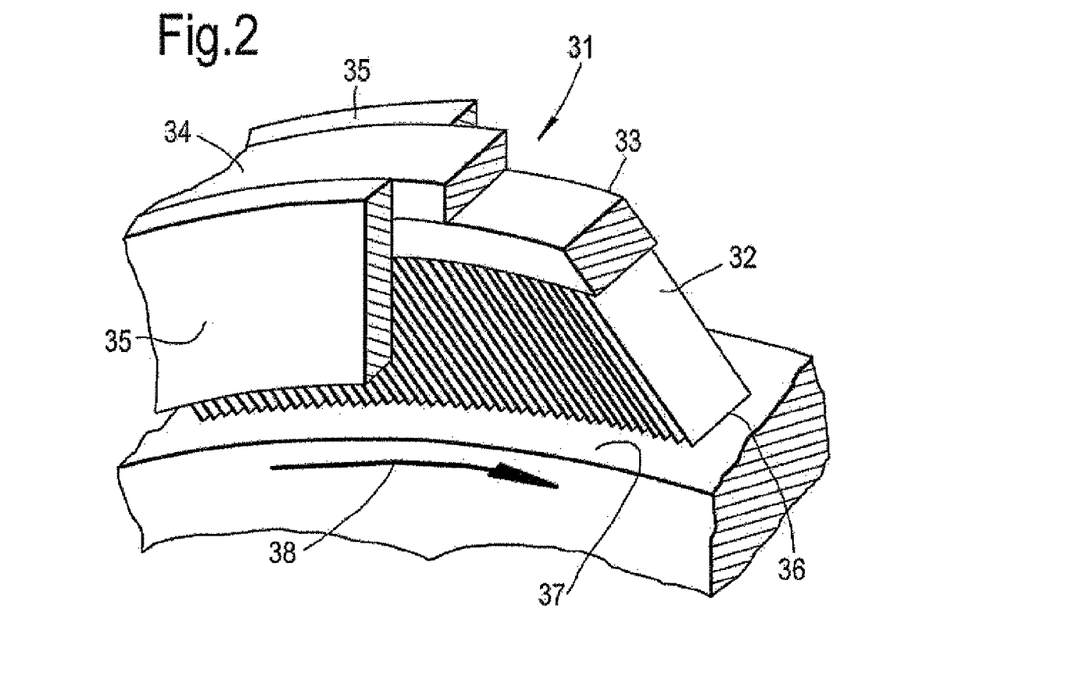
FIG. 2 shows schematically a cut-away perspective view of a portion of a leaf seal assembly.

In a gas turbine engine, leaf seals may be used to form a seal between a static component and a rotating component, between two relatively rotating components, or even between two static components in order to maintain a relatively high pressure on one side of the seal and relatively low pressure on the other. FIG. 2, which shows schematically, for example, a cut-away perspective view of a portion of a leaf seal assembly 31 comprises seal elements 32 extending from spacer elements 33 secured in a housing comprising a backing ring 34 with side plates 35. The seal leaf elements 32 present leaf edges 36 towards a surface 37 of a rotating component generally rotating in the direction depicted by arrowhead 38. The leaves 32, and in particular the leaf edges 36 of the leaves 32 act against the surface 37 in order to create a seal across the assembly 31. Each leaf section 32 is generally compliant in order to adjust with rotation of the surface 11 to ensure that a good sealing effect is created. The spacers 33 are generally required in order to ensure that flexibility is available to appropriately present the leaf seal elements 32 towards the surface 37 which, as illustrated, is generally with an inclined angle between them.

Assembly of leaf seals is relatively complex in terms of the number of leaves in the assembly and the importance of correctly aligning and spacing leaves in order to achieve best effect. Formation of leaf seals using a pleated band or strip has been proposed and is described in WO 01/59338. In this arrangement a metal strip is essentially stamped in order to define a plurality of leaf sealing elements and the strip or band then folded in order to create by concertina compression a leaf seal which is then mounted within a housing for presentation towards a surface to be sealed. Unfortunately, such an arrangement is not ideal in that the edges of leaf seal elements are not generally efficiently presented towards the surface to be sealed and each seal element is substantially flat and abuts against itself such that in compression there is significant strain on the folded section at the corners of each seal element and inadequate control of space in between elements for best sealing effect. It will be understood that leaf seals depend upon the space in between the leaf edges in order to be effective. If leaf seal edges are not effectively suspended, then either a large gap will open up under the leaves or a heavy contact will occur between the leaf edges and the shaft, both of which will lead to an ineffective seal.

EP A 1878955 proposes a method of forming leaf seals comprising etching leaves in a strip, each leaf being etched at a tilt angle to create a step when each leaf is concertina folded against its adjacent neighbour, and folding the strip whereby the leaves are juxtaposed to present a seal surface formed by each leaf edge of each leaf. EP A 1878955 also proposes a method of forming leaf seals comprising etching leaves in a strip, each leaf having a spacer section, and spacers for the leaves being defined by removal of at least part of the remainder of at least some of the leaves.

Figure 3:
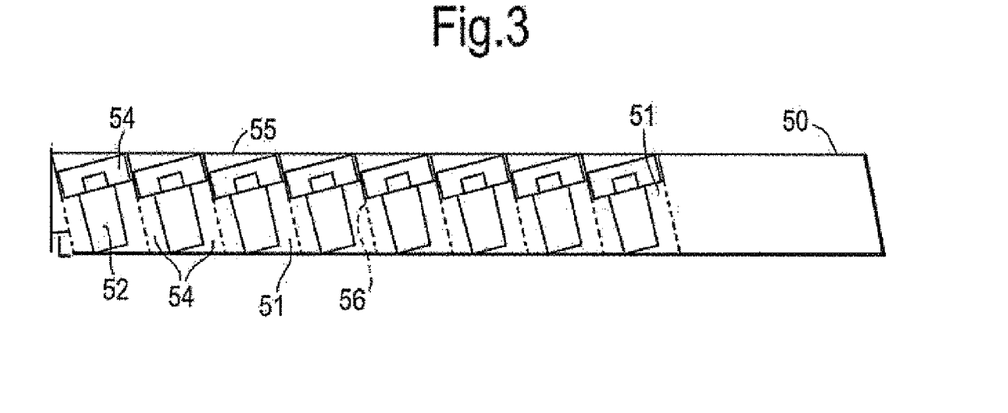
FIG. 3 shows schematically a strip appropriately photochemically machined in order to create respective leaf seal sections.

Thus FIG. 3 shows schematically a strip 50 appropriately photochemically machined in order to create respective leaf seal sections 51. Each leaf seal section 51 comprises a seal element leaf 52 and a root section 53. Due to the tilt angle L, which is exaggerated for convenient demonstration, there are waste areas in relation to sides 54 and top 55 which are removed as required. The root sections 53 are of thicker section than the operational leaf seal elements 52 and this is achieved in the strip 50 through appropriate machining such as photo-chemical machining of the leaf seal elements 52. Between each leaf section 51 a fold section 56 is provided to enable a zigzag fold to be performed. The fold sections 56 can also be thinned to reduce stresses on bending.

Figure 4:
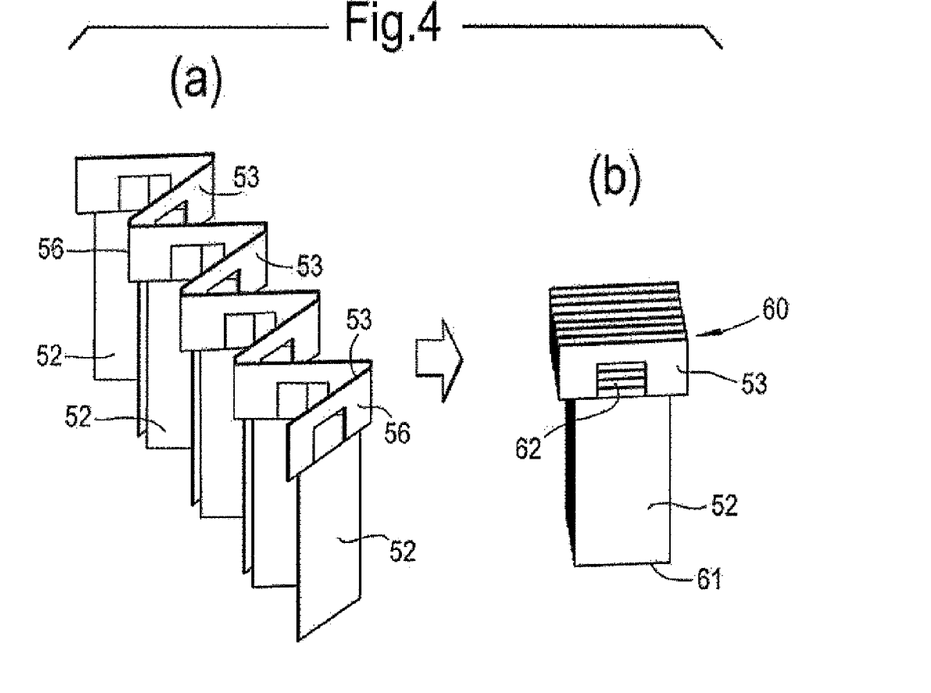
FIG. 4 illustrates progressive stages (a) and (b) in the folding of the leaf seal sections of FIG. 3.

FIG. 4 illustrates schematically folding of the leaf sections formed by provision of the folded sections 56 and the removal of the waste areas 54, 55 from the strip 50 depicted in FIG. 3. Thus, as can be seen with the waste areas 54, 55 removed, the root sections 53 are still attached at the fold lines 56 in a staggered configuration. As the folding section 56 is of a thinner section, a zigzag fold can be provided about these sections 56 in order to move through the stage depicted in FIG. 4(a) to a compressed stack or tuft 60 with juxtaposed root sections 53 presenting the seal elements 52 at an appropriate lay angle as depicted in FIG. 4(b). Essentially, the stack 60 leans such that bottom leaf edges 61 are appropriately presented in use relative to a seal surface. Typically a hole 62 is provided in each root section 53 in order to create a plenum chamber by the juxtaposed root sections 53 in order to achieve the desired pressure distribution about a seal assembly in use.

Figure 5:
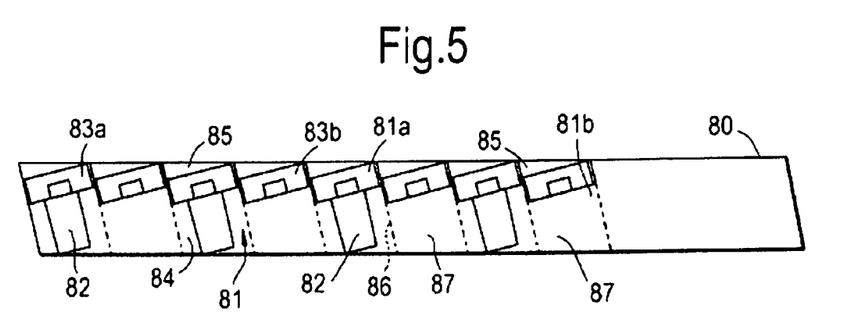
FIG. 5 shows schematically another strip appropriately photochemically machined in order to create respective leaf seal sections.
Figure 6:
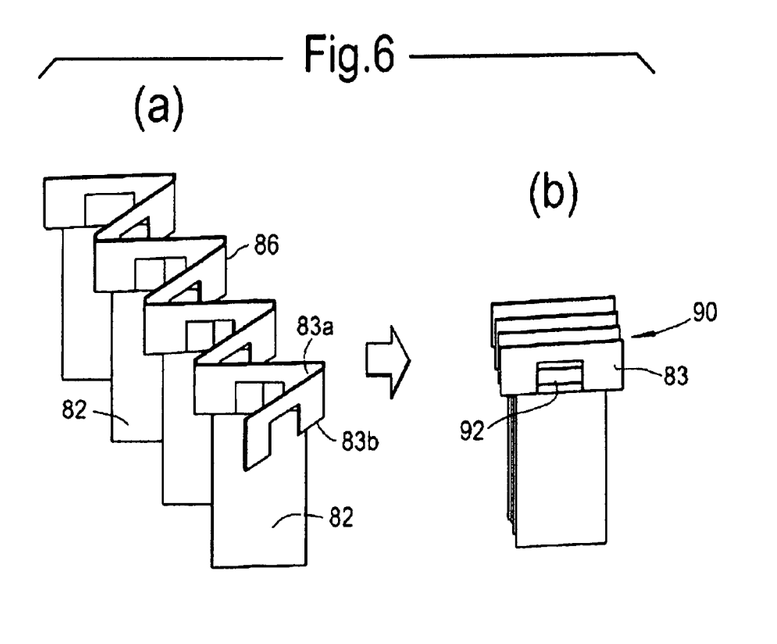
FIG. 6 illustrates progressive stages (a) and (b) in the folding of the leaf seal sections of FIG. 5.

As shown in FIGS. 5 and 6, it is possible to create a strip 80 in which leaf elements 81 are again defined between fold sections 86, but alternate leaf sections 81a, 81b are arranged such that in leaf section 81a a root section 83a is provided along with a leaf seal element 82, whilst in adjacent leaf section 81*b* the whole of the strip (i.e. the area 85 as well as area 87) other than a spacer 83*b* between root sections 83*a* to which seal elements 82 are attached. This allows larger inter-leaf gaps to be formed.

A zigzag fold is then performed about fold edges 86 in order to create a compressed stack 90 which has alternating root section 83*a* and spacers 83*b* juxtaposed to each other. Again, a pressure equalisation plenum chamber is created by holes 92 in each root section 83*a* and spacer 83*b* which extends annularly about the seal assembly to achieve sealing, efficiency.

Leaf-spacer folded pairs may also be provided. A multitude of such pairs can be assembled into a leaf seal assembly.

Figure 7:
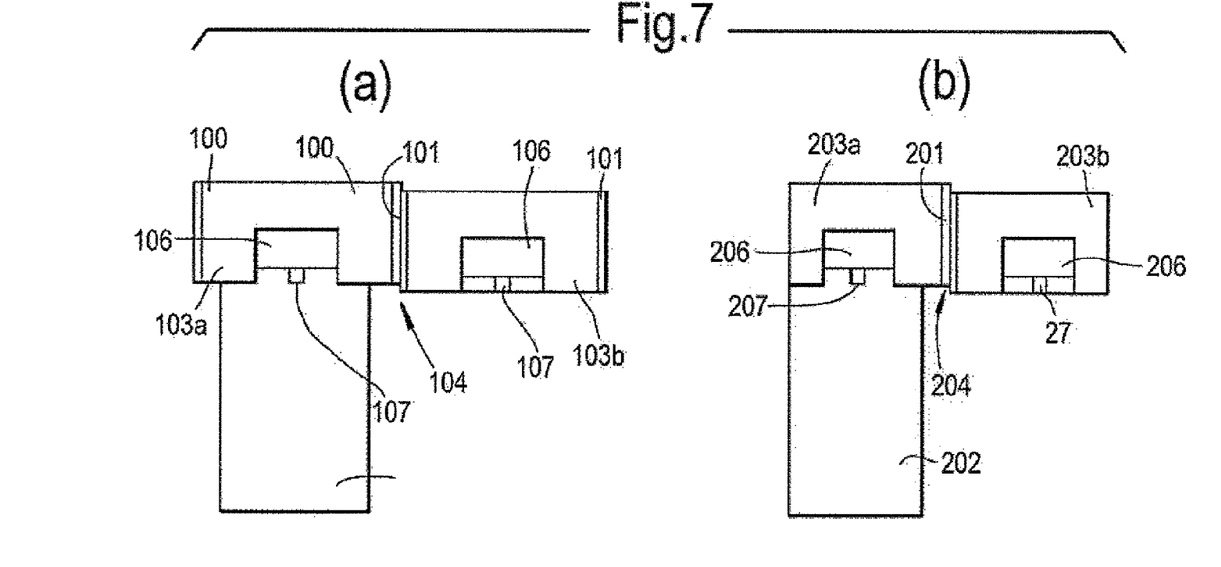
FIG. 7 shows schematically a seal element and spacers for forming leaf-spacer folded pairs with (a) a double side arm arrangement, and (b) a single side arm arrangement.

As depicted in FIG. 7(*a*) a double side arm arrangement has a root section 103*a* with a hole 106 to provide a plenum chamber for pressure distribution in the eventual seal assembly. Again folded sections 101 are provided such that there is a step between the spacer 103*a* to which a seal element 102 is secured and a spacer 103*b*. In the double arm arrangement depicted in FIG. 7(*a*) there is an arm 100 in the root section 103*a* either side of the element 102. The stepped alignment 104 is again determined by the tilt angle in the strip from which the leaf-spacer folded pair is formed.

As depicted in FIG. 7(*b*) a single arm leaf-spacer folded pair is depicted. Thus, again a root section 203*a* is provided to which a seal element 202 is secured with an aperture 206 in order to form a plenum chamber for pressure distribution in use. There is a step between the root section 203*a* and a spacer 203*b*. Again, there is a fold section 201 in between the root section 203*a* and the spacer 203*b* in order to form the leaf-spacer folded pair for assembly into a leaf seal assembly as described later.

Both the arrangements of leaf-spacer folded pairs depicted in FIG. 7 can be appropriately photochemically machined from a sheet, and both may incorporate reinforcing 107, 207 to facilitate assembly strengths.

Figure 8:
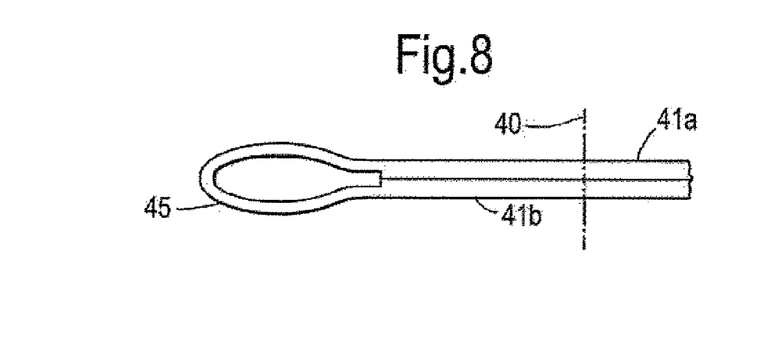
FIG. 8 illustrates an exaggerated fold between two leaf sections.

The leaf stacks and leaf-spacer folded pairs described above are fitted into an assembly jig and joined together e.g. by a welding or brazing processes, as described in EP A 1878955, to form complete leaf seal assemblies. After joining, the folding sections are generally machined away. For example, FIG. 8 illustrates an exaggerated fold between two leaf sections. Thus, leaf section 41*a* is forced into abutment and brazed or welded or otherwise secured in position against leaf section 41*b*. The folding section 45 is thinned and as depicted rounded to reduce stressing. The section to the left of broken line 40 can be machined away after brazing the leaf sections 41*a*, 41*b* together.

An aim of the present invention is to provide performance improvements in leaf seals.

Accordingly a first aspect of the present invention provides a process for forming a leaf-spacer pair for use in a leaf seal which effects a seal between two components, wherein the process includes the steps of:
  (a) providing a leaf section which maintains, in the leaf seal, wiping contact with one of the components, and a root section from which the leaf section extends and which, in the leaf seal, is fixed relative to the other component, the leaf section and the root section being formed from a first sheet of material of substantially uniform thickness;
  (b) providing a spacer formed from a second sheet of material, the spacer being physically separate from the leaf section and the root section; and
  (c) fastening the spacer to the root section to form a leaf-spacer pair in which the spacer overlays the root section and remains fixed relative thereto on handling of the leaf-spacer pair. The leaf-spacer pair thus-formed is a separate item that is manoeuvrable and useable independently of any other leaf-spacer pairs. By "physically separate" we mean that the spacer provided at step (b), until fastened to the root section at step (c), has no direct or indirect connection to the leaf section and the root section.

And a second aspect of the present invention provides a process for forming a stack of leaves for use in a leaf seal, the process including:
  repeatedly performing the process of the first aspect to form a plurality of leaf-spacer pairs; and
  combining the leaf-spacer pairs into a stack in which the leaf sections are arranged face-to-face and the spacers interpose between the root sections to space the leaf sections a controlled distance apart.

A third aspect of the present invention provides a leaf-spacer pair for use in a leaf seal, the leaf-spacer pair being formed by the process of the first aspect. Thus, the third aspect provides a leaf-spacer pair for use in a leaf seal which effects a seal between two components, the leaf-spacer pair having a leaf section which, in the leaf seal, maintains wiping contact with one of the components, and a root section which, in the leaf seal, is fixed relative to the other component and from which the leaf section extends, the leaf-spacer pair further having a spacer, wherein the leaf section and the root section are formed from a first sheet of material of substantially uniform thickness, the spacer is formed from a second sheet of material, and the spacer is fastened to the root section such that the spacer overlays the root section and remains fixed relative thereto on handling of the leaf-spacer pair. The second sheet is typically not the same sheet as the first sheet. In this way, the second sheet can be a different material and/or have a different thickness to the first sheet. However, it is not excluded that the first and second sheets are of the same material and have the same thickness. A fourth aspect of the present invention provides a stack of leaves for use in a leaf seal, the stack being formed by the process of the second aspect. Thus, the fourth aspect provides a stack of leaves for use in a leaf seal, the stack including a plurality of leaf-spacer pairs of the third aspect combined into a stack in which the leaf sections are arranged face-to-face and the spacers interpose between the root sections to space the leaf sections a controlled distance apart. A fifth aspect of the present invention provides a leaf seal including one or more leaf-spacer pairs of the third aspect or one or more stacks of leaves of the fourth aspect.

The present invention is at least partly based on a realisation that thinned leaf sections can have problems of poor surface finish and premature leaf section failure.

Advantageously, however, controlled distances between leaf sections can be achieved by providing separate spacers, and allowing leaf sections to retain the original sheet thickness. In particular, a leaf-spacer pair in which the spacer remains fixed relative to the root portion on handling of the pair facilitates formation of leaf stacks from such pairs and increases flexibility in the material choice and thickness of the spacer.

Optional features of the invention will now be set out. These are applicable singly or in any combination with any aspect of the invention.

Optionally, after step (a) and before step (c), the root section can be thinned, e.g. by photochemical machining or micromachining, to provide further control of the distance between the leaf sections in a stack. However, generally, such thinning of the root section is not needed.

In step (c) the spacer may be mechanically fastened to the root section. For example, the mechanical fastening may conveniently include a press-fit fastening arrangement. Additionally or alternatively, the mechanical fastening may include folding the spacer around the root section to fasten it thereto.

Additionally or alternatively, in step (c) the spacer may be adhesively fastened to the root section.

In step (a) the first sheet is preferably a rolled sheet and the leaf section retains the as-rolled finish. For example, the first sheet can be a cold-rolled sheet. Advantageously, a cold-rolled finish has been found to improve leaf section performance and reliability.

The first sheet may be formed from an Ni-based or a Co-based alloy, such as a superalloy. Alternatively, the first sheet may be formed from an Fe-based alloy, such as a stainless steel.

The second sheet can be formed from the same material as the first sheet. Alternatively, however, the second sheet can be formed from a different material to the first sheet. For example, the material of the second sheet can have a different coefficient of thermal expansion to the material of the first sheet, allowing a leaf seal formed from such leaf-spacer pairs to exploit differential thermal effects in order to e.g. expand or contract the distance between leaf sections, and hence the effectiveness of the seal, in response to temperature.

The second sheet can be made from a non-metallic material or a plastic.

The second sheet may be in a wedge shape to facilitate the creation of a circular seal.

The second sheet may be pre-stamped to create accurately controlled spacer shape (e.g. wedge) and/or thickness.

The second sheet may incorporate braze alloy to facilitate the brazing of the seal.

The second sheet may be made of two (or more) sheets which may or may not be similar. If they are dissimilar with different coefficients of thermal expansion then they may facilitate the leaf-spacer pairs to exploit thermal effects in response to temperature.

Embodiments and further optional feature of the invention will now be described by way of example with reference to the accompanying drawings in which.

Figure 9:
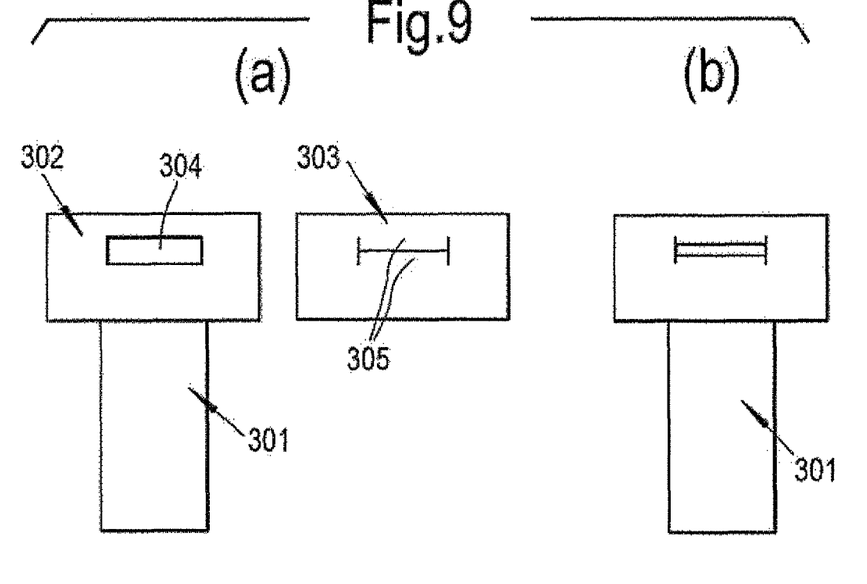
FIG. 9 shows schematically progressive stages (a) and (b) in the formation of a leaf-spacer pair according to a first embodiment of the present invention.

FIG. 9 shows schematically progressive stages (a) and (b) in the formation of a leaf-spacer pair according to a first embodiment of the present invention. FIG. 9(a) shows a leaf section 301 and a root section 302 from which the leaf section extends, both stamped from a cold-rolled first sheet of material of substantially uniform thickness. A central hole 304 is cut out of the root section. FIG. 9(a) also shows a separate spacer 303 from a second sheet of material. Central cuts in the spacer produce a pair of tabs 305. The spacer is approximately the same size as the root section, but may have a different thickness.

In FIG. 9(b), the spacer 303 is pressed onto the root section 302 so that the tabs 305 are bent into the central hole 304. In this way, a leaf-spacer pair is formed in which the spacer is mechanically fastened to the root section, so that it overlays the root section and remains fixed relative thereto on subsequent handling of the leaf-spacer pair.

Figure 10:
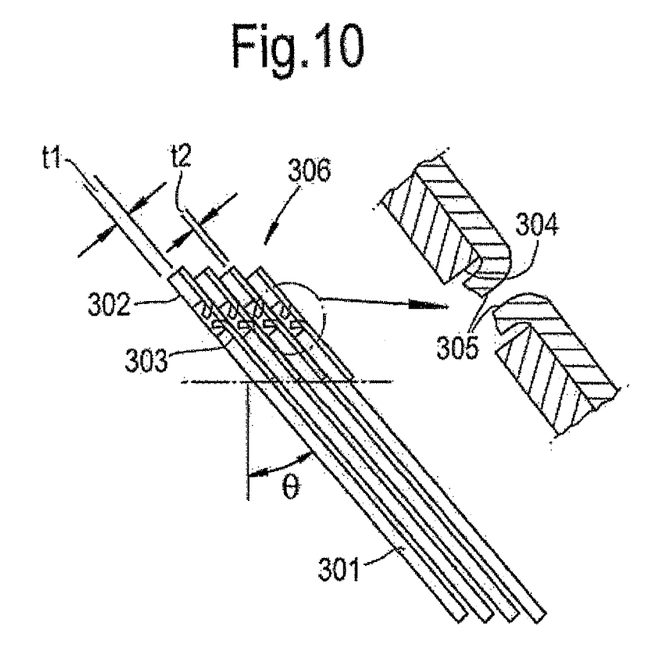
FIG. 10 is a schematic side view of a leaf stack formed by stacking leaf-spacer pairs of the first embodiment.
Figure 11:
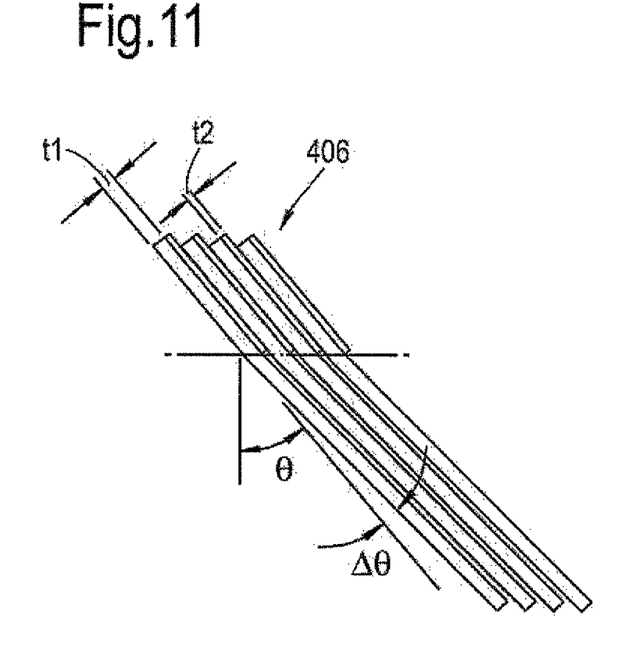
FIG. 11 is a schematic side view of a further leaf stack formed by stacking leaf-spacer pairs of the first embodiment after bending along the join lines between the leaf sections and the root sections to adjust the lay angle.

Further leaf-spacer pairs can be formed in the same way, and, as shown in FIG. 10, these can be combined into a stack 306 of lay angle θ in which leaf sections 301 are arranged face-to-face and the spacers 303 interpose between the root sections 302 to space the leaf sections a controlled distance apart, the leaf-spacer pairs subsequently being brazed or welded together in the stack. The mechanically fastened spacers remain securely fixed to their respective root sections during the stacking procedure. The thickness t1 of the first sheet from which the leaf and root sections are formed defines the thickness of the leaf sections in the stack, and the thickness t2 of the second sheet from which the spacers are formed determines the spacing between the leaf sections. Conveniently, the central hole 304 and the opening formed by the bent tabs 305 can combine in the stack to form a pressure equalisation plenum chamber. Further adjustment to the spacing between the leaf sections can be made by bending along the join lines between the leaf sections and the root sections. As shown in FIG. 11, which is a schematic side view of a further leaf stack 406, this can produce an adjustment, Δθ, in the lay angle θ of the stack.

Thinning by photochemical machining can be associated with premature leaf section failure (e.g. due to surface roughness and hydrogen embrittlement). However, advantageously, by providing mechanically fastened spacers, it is not necessary to thin the leaf sections to vary the spacing between the leaf sections in the stack. Thus the reliability and longevity of the leaf seal can be improved.

Figure 12:
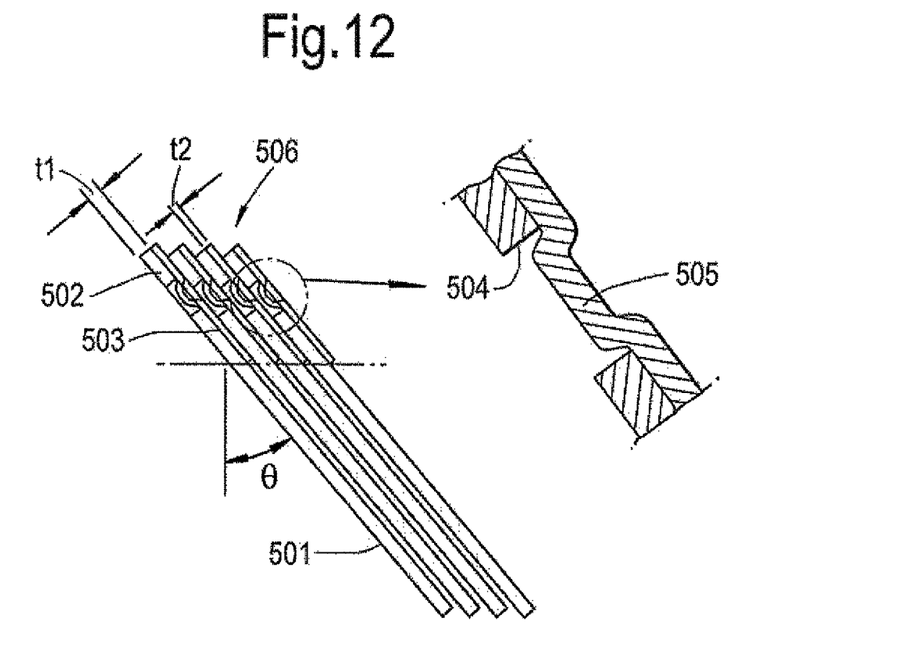
FIG. 12 is a schematic side view of a leaf stack according to a second embodiment of the present invention.
Figure 13:
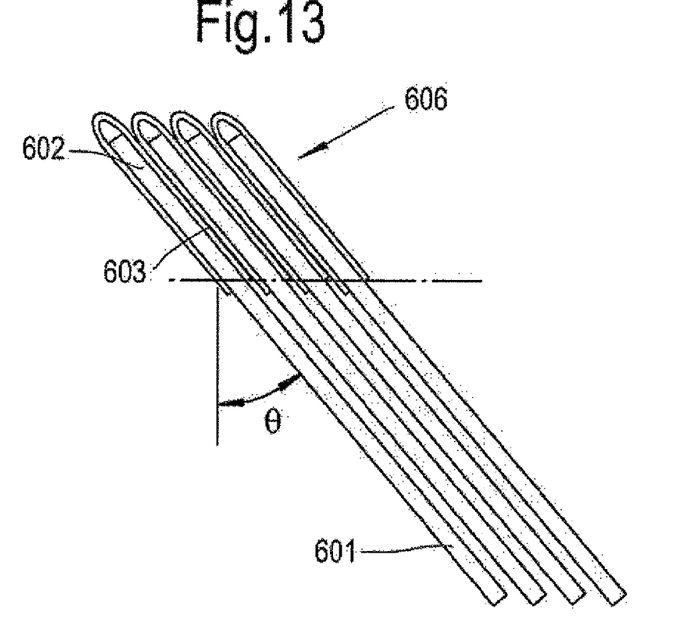
FIG. 13 is a schematic side view of a leaf stack according to a third embodiment of the present invention.
Figure 14:
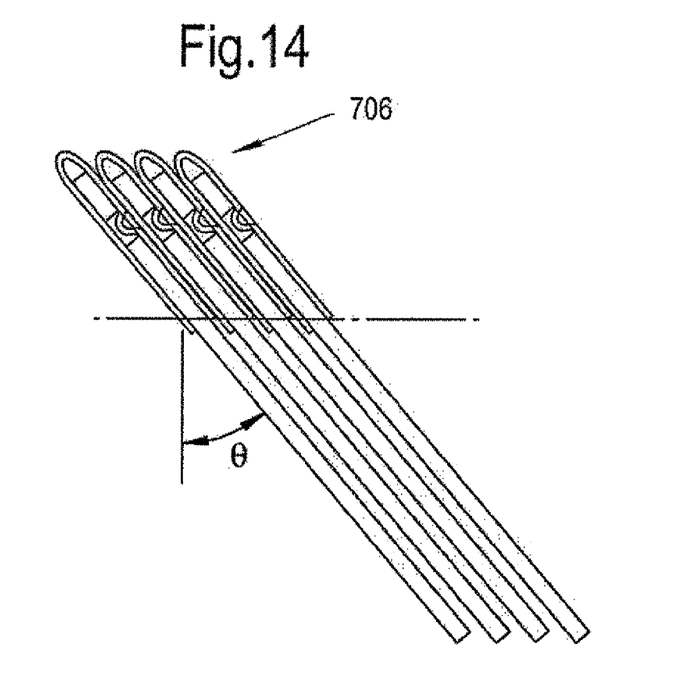
FIG. 14 is a schematic side view of a leaf stack according to a fourth embodiment of the present invention.

Various modifications can be made to the fastening arrangement between the root section and spacer in the leaf-spacer pair. For example, FIG. 12 is a schematic side view of a leaf stack 506 according to a second embodiment of the present invention in which, in each leaf-spacer pair, the spacer 503 has a single push lock press tab 505 which is pushed into a central hole 504 in the root section 502. Unlike the first embodiment, a pressure equalisation plenum chamber is not formed. FIG. 13 is a schematic side view of a leaf stack 606 according to a third embodiment of the present invention in which, in each leaf-spacer pair, the spacer 603 folded over the root section 602 to fasten it thereto. The spacing between the leaf sections 601 in the stack is therefore double the spacer thickness. FIG. 14 is a schematic side view of a leaf stack 706 according to a fourth embodiment of the present invention which, in each leaf-spacer pair, combines a folded over spacer with a push lock fastening arrangement for additional security. A further option is to use adhesive to fasten the root section and spacer of each leaf-spacer together.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A process for forming a leaf-spacer pair for use in a leaf seal which effects a seal between two components, wherein the process includes the steps of:
   (a) providing a leaf section which maintains, in the leaf seal, wiping contact with one of the components, and a root section from which the leaf section extends and which, in the leaf seal, is fixed relative to the other component, the leaf section and the root section being formed from a first sheet of material of substantially uniform thickness;
   (b) providing a spacer formed from a second sheet of material, the spacer being physically separate from the leaf section and the root section; and
   (c) mechanically fastening the spacer to the root section by a press-fit fastening arrangement so that the spacer is parallel to and in direct contact with the root section to form a leaf-spacer pair in which the spacer overlays the root section and remains fixed relative to the root section on handling of the leaf-spacer pair,
   wherein the spacer includes a mating feature and the root section includes a complimentary mating feature, and the mechanical fastening includes pressing the mating feature and the complimentary mating feature together so that they interlock to substantially fix the root section relative to the spacer.

2. A process according to claim 1, wherein in step (c) the spacer is additionally adhesively fastened to the root section.

3. A process according to claim 1, wherein in step (a) the first sheet is a rolled sheet and the leaf section retains the as-rolled finish.

4. A process according to claim 1, wherein the first sheet is formed from an Ni-based or a Co-based alloy.

5. A process according to claim 1, wherein the first sheet is formed from an Fe-based alloy.

6. A process according to claim 1, wherein the second sheet is formed from a different material to the first sheet.

7. A process according to claim 1, wherein the second sheet incorporates braze alloy to facilitate final brazing of the seal.

8. A process according to claim 1, wherein the second sheet is formed from a non-metallic material or plastic.

9. A process according to claim 1, wherein the second sheet is non-planar and is of a wedge shape to facilitate the construction of arcuate segments.

10. A process according to claim 1, wherein the second sheet is formed from more than one sheet of different materials.

11. A process according to claim 1, wherein the second sheet is pre-stamped with raised features to accurately control its thickness and/or shape, and has a wedge shape to facilitate the construction of arcuate segments.

12. A process for forming a stack of leaves for use in a leaf seal, the process including:
   repeatedly performing the process of claim 1 to form a plurality of leaf-spacer pairs; and
   combining the leaf-spacer pairs into a stack in which the leaf sections are arranged face-to-face and the spacers interpose between the root sections to space the leaf sections a controlled distance apart.

13. A leaf-spacer pair for use in a leaf seal, the leaf-spacer pair being formed by the process of claim 1.

14. A stack of leaves for use in a leaf seal, the stack being formed by the process of claim 12.

15. A leaf seal including one or more leaf-spacer pairs of claim 13.

16. A process for forming a leaf-spacer pair for use in a leaf seal which effects a seal between two components, wherein the process includes the steps of:
   (a) providing a leaf section which maintains, in the leaf seal, wiping contact with one of the components, and a root section from which the leaf section extends and which, in the leaf seal, is fixed relative to the other component, the leaf section and the root section being formed from a first sheet of material of substantially uniform thickness;
   (b) providing a spacer formed from a second sheet of material, the spacer being physically separate from the leaf section and the root section; and
   (c) mechanically fastening the spacer to the root section so that the spacer is parallel to and in direct contact with the root section to form a leaf-spacer pair in which the spacer overlays the root section and remains fixed relative to the root section on handling of the leaf-spacer pair,
   wherein the mechanical fastening includes folding the spacer around the root section to fasten the spacer to the root section.

17. A process for forming a leaf-spacer pair for use in a leaf seal which effects a seal between two components, wherein the process includes the steps of:
   (a) providing a leaf section which maintains, in the leaf seal, wiping contact with one of the components, and a root section from which the leaf section extends and which, in the leaf seal, is fixed relative to the other component, the leaf section and the root section being formed from a first sheet of material of substantially uniform thickness;
   (b) providing a spacer formed from a second sheet of material, the spacer being physically separate from the leaf section and the root section; and
   (c) mechanically fastening the spacer to the root section by folding the spacer around the root section to fasten the spacer to the root section to form a leaf-spacer pair in which the spacer overlays the root section and remains fixed relative to the root section on handling of the leaf-spacer pair.

* * * * *